March 30, 1937. B. GASPAR 2,075,191
METHOD OF PRODUCING COLORED PHOTOGRAPHS
Filed Jan. 11, 1935
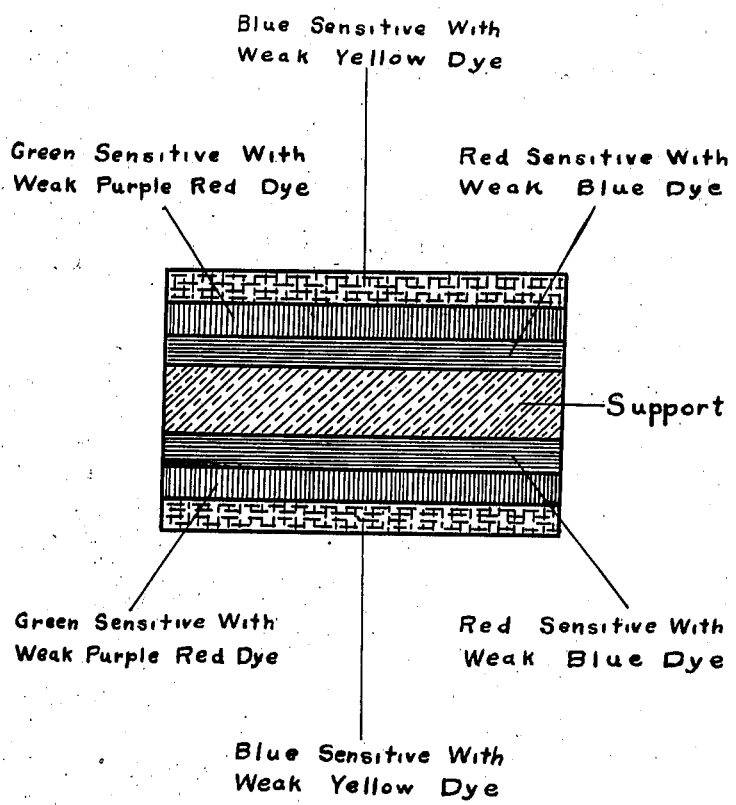
Bela Gaspar INVENTOR
ATTORNEY Patented Mar. 30, 1937

2,075,191

UNITED STATES PATENT OFFICE 2,075,191

METHOD OF PRODUCING COLORED PHOTOGRAPHS

Béla Gaspar, Brussels, Belgium

Application January 11, 1935, Serial No. 1,438
In Germany January 23, 1934

5 Claims. (Cl. 95—2)

It is known in the production of color photographs to pour different, intensely colored light-sensitive layers one on to the other, and to expose these simultaneously.

In order to be able to expose each layer with the requisite amount of light, the single part-layers require to be sensitized in respect of those spectral ranges which are transmitted by the particular layer itself and the layer situated thereover after which all the layers may be developed and the resultant silver image converted into a color image by selective reactions which destroy the dye at the points of the silver image, or vice versa, as described in my prior Patent No. 1,985,344.

If, however, the three layers are colored in the basic colors, for example purple red, yellow and blue-green, the three layers together when held against the light will result in black, for which reason no light of the visible spectrum is able to reach the lowermost layer. A material of this nature would not be useful for purposes of immediate exposure in a camera, as the infra-red rays, so far as these may be present in natural and artificial light sources, would result in an incorrect reproduction of the tone values in the image.

It has already been proposed to sensitize intensely colored photographic layers so as to be complementary to their coloring. Exposure of this material, however, is impracticable because in each colored layer complementary colored rays are readily absorbed at the surface of the layer by the color of the layer itself, so that an image cannot be produced.

If the coloring of the part-layers were made less intense for the purpose of producing an image deeper in the layer, without particular precautions, the result would be a colored image of insufficient strength and saturation.

According to the invention, there are employed relatively weakly colored layers of such kind i. e., light sensitive silver halide layers sensitized to light complementary to their color, which allow the complementary light to pass in sufficient amount. Thus, for example, a yellow layer of this nature is sensitized in respect to blue light. In the same manner the remaining layers are sensitized to light which is complementary to their own color. If three weakly colored part images, which are assumed to be, say, blue-green, yellow and red, are placed one over the other, a saturated multi-color image is naturally not obtained. This image would not appear natural, and would not be satisfactory from an aesthetic point of view. If, however, two inadequate images of this kind are united, an optical amplification is obtained which results in a multi-color image of sufficient saturation and true to nature. This amplication may be accomplished, as more specifically pointed out hereinafter, by forming identical multi-color images of this kind in a set of layers on each side of a backing or support or by a plurality of such sets on the same side of the support.

A material of the kind in question, the single layers of which transmit light complementary to their own color, may also be employed for purposes of immediate exposure in a camera.

It is also contemplated that a weak multi-color image of the kind in question may be copied to form an identical image of like color concentration and that the two weak images may be combined to form a single full color image.

The invention differs from the known combination of single color part-images by the fact that a plurality of finished multi-color images are combined. The possibility is then obtained of copying in direct fashion from natural-color master images without the production of intermediate master images or part negatives.

It is possible, for example, to copy in immediate fashion from color screen plates on to materials which comprise, for instance, a plurality of superimposed layers. Or if it is desired to make copies of a colored cinematograph film, duplicate copies may be made direct without the production of intermediate master images. This principle may be applied both to images for viewing against the light as well as images for direct observation. It is possible to employ either materials which contain the corresponding color part-images separately or materials having layers poured one on to the other, or arrangements of equivalent effect, in which, for example, differently colored and sensitized particles of emulsion are juxtaposed or superimposed to each other. A greatly preferred form of embodiment of the invention consists in the use of a cinematograph film material which is coated on both sides, and in which there are two, or three, differently colored part-layers on either side, the coloring of the single part-layers being so weak that the latter permit of a sensitization in respect to the rays of light complementary to the color of the layers. This is a primary condition also in other arrangements, in which the single colored layers consist either separably or collectively of juxtaposed or superimposed colored and sensitized particles of emulsion.

For the production of images for direct observation a particularly favorable method consists in applying a weakly colored multi-color image to paper or the like and a like image either to a transparent foil or in a fashion permitting of transfer, the final colored image being obtained by combination of the multi-color images insufficiently colored per se.

Generally speaking, the combination of two images will be sufficient. The possibility, however, may also arise of combining a larger number.

*Example*

To either side of a cinematograph film there are applied the following light sensitive silver halide layers: a weak yellow layer, which contains .3 grammes Chrysophenine (Index No. 726, Schultz Farbstofftabellen, 1. Bd. 1931, 7th ed.) per square metre, a weak purple-red layer, which contains .3 grammes Diamine fast pink BBF (a dyestuff supplied by the Gesellschaft für Chemische Industrie in Basel, Switzerland) per square metre and is sensitized for green with thioisocyanine, and a layer colored blue with Benzolightblue 8 GL (Index No. 617, Schultz Farbstofftabellen, 1. Bd. 1931, 7th ed.) at 6 grammes per square metre and sensitized in respect to red with Pinacyanol.

The concentrations of the dyestuffs refer to technical, commercial dyestuffs such as employed by dyers. The densities require to be determined in each individual case in the known fashion. In the case of the stated concentrations the dyestuffs do not reveal any sharp absorption. Yellow still allows the transmission of blue, purple-red the transmission of green, and blue-green the transmission of red.

The same dyestuffs and sensitizations are also contained in the layers on the opposite side of the film. The same dyes and sensitizations may also be employed for the equivalent arrangements for the production of single colored foils and also for the production of different-colored and different-sensitized particles of emulsion.

The dyestuffs may be fixed in the layers by the formation of insoluble salts. In the arrangement according to the invention, however, there is obtained the advantage that in view of the comparatively extensive dilution of the dyestuffs a special fixing in the layer is not always required.

The exposure of the material may take place in contact or by an optical process.

What I claim as new and desire to secure by Letters Patent is:

1. A photographic material for producing colored cinematograph images, comprising a transparent support, duplicate sets of predyed light sensitive silver halide layers, one of said sets being on each side of said support, each of the layers of each set being differently colored to form a multi-color image and predominantly sensitized for light rays which are absorbed by the dyestuff in the layer, the dyestuff in each set of layers being insufficient in concentration for natural reproduction of an image but sufficient for natural color reproduction in combination with the set of layers on the opposite side of said support.

2. A method of producing natural multi-color photographs with a light sensitive material including a support carrying a plurality of sets of predyed light sensitive silver halide emulsions each emulsion being colored a different color in insufficient concentration for natural reproduction and predominantly sensitized for a spectral range in which the dyestuff present in the emulsion is absorptive, which comprises simultaneously exposing said plurality of sets to produce coincident identical latent images, developing the exposed material and producing a weak multi-color image in each set by local destruction of the dyestuff in accordance with said latent images.

3. A method of producing natural multi-color photographs with a light sensitive material including a support carrying a set of predyed light sensitive silver halide emulsions on each side thereof, each emulsion being colored a different color in insufficient concentration for natural reproduction and each emulsion being prediminantly sensitized for a spectral range in which the dyestuff is absorptive, which comprises exposing said material from both sides to produce coincident identical latent images, developing the exposed material and producing a weak multi-color image in each set by local destruction of the dyestuff in accordance with said latent images.

4. A method of producing natural multi-color photographs which comprises exposing a material including an opaque support and a set of predyed light sensitive silver halide emulsions, each emulsion being colored a different color in insufficient concentration for natural reproduction and predominantly sensitized for a spectral range in which the dyestuff present in the emulsion is absorptive, developing the exposed material, producing a weak multi-color image in said set of emulsions by local destruction of the dyestuff in accordance with the developed silver image, producing in like manner an identical weak multi-color image in a like material supported on a transparent foil and superimposing the last referred to multi-color image over the first referred to multi-color image by mounting said transparent foil on said opaque support.

5. A method of producing natural multi-color photographs which comprises exposing a material including a support and a set of predyed light sensitive silver halide emulsions, each emulsion being colored a different color in insufficient concentration for natural reproduction and predominantly sensitized for a spectral range in which the dyestuff present in the emulsion is absorptive, developing the exposed material, producing a weak multi-color image in said set of emulsions by local destruction of the dyestuff in accordance with the developed silver image, producing in like manner a culti-color copy of said first multi-color image in a like material and superimposing said first multi-color image and said multi-color copy.

BÉLA GASPAR.